May 23, 1933.    M. R. HUTCHISON    1,910,835
FUEL CONTROL SYSTEM FOR INTERNAL COMBUSTION ENGINES
Filed Aug. 7, 1929
*Fig.1.*
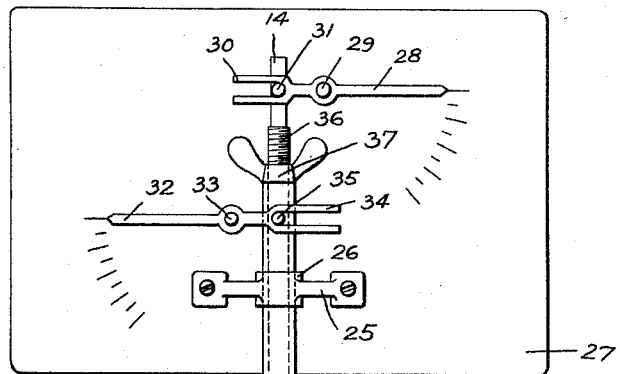
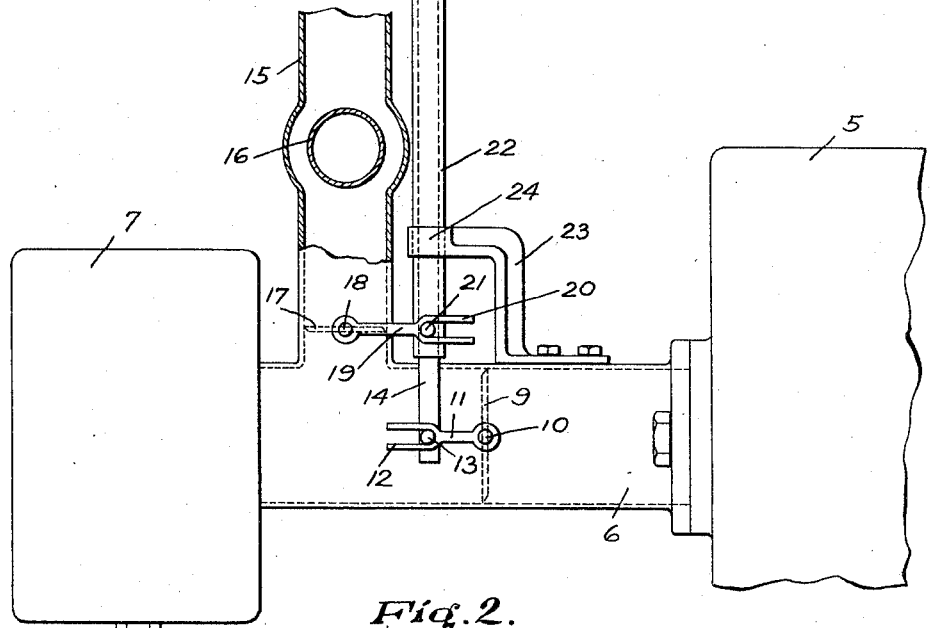
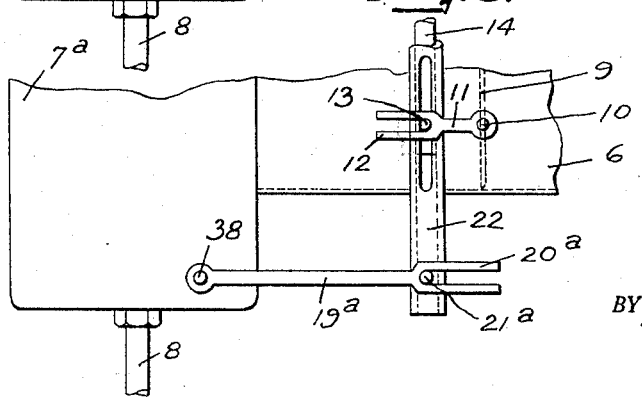
*Fig.2.*
INVENTOR.
Miller Reese Hutchison.
BY Snell, Dunn & Anderson
ATTORNEYS.

Patented May 23, 1933

1,910,835

UNITED STATES PATENT OFFICE

MILLER REESE HUTCHISON, OF NEW YORK, N. Y., ASSIGNOR, BY MESNE ASSIGNMENTS, TO GAS ANALYZING AND FUEL REGULATING CORPORATION, OF NEW YORK, N. Y., A CORPORATION OF DELAWARE

FUEL CONTROL SYSTEM FOR INTERNAL COMBUSTION ENGINES

Application filed August 7, 1929. Serial No. 384,085.

This invention relates to improvements in fuel control systems for controlling the fuel supply of internal combustion engines, and with reference to more particular features thereof it relates to improvements in fuel control systems wherein automatic control is exerted over the mixture of the combustible fuel.

It is a general object of the invention to provide an improved means operating effectively and surely under all conditions to minimize the tendency of the internal combustion engine to stall or stop prematurely when the fuel supply is adjusted from running condition under load to an idling or starting condition.

It is a more particular object of the invention to provide an improved automatic operating means for adjusting the fuel mixture supplied to an internal combustion engine, from the running or load condition thereof to the idling or starting condition whenever the fuel control throttle is adjusted into idling or starting position.

A further object of the invention is to provide in a fuel supply system of the class mentioned, an improved arrangement whereby the fuel mixture is automatically adjusted to idling or starting value whenever the operator adjusts the fuel supply to idling or starting value, thus making it unnecessary for the operator to keep in mind the necessity for adjusting the fuel mixture for idling or starting, and minimizing the danger of stalling the engine.

A further and more specific but important object of the invention is to provide in engine fuel control systems having a separate manual or other control device for controlling the fuel mixture to adapt it to running condition, an improved arrangement whereby the fuel mixture may be automatically adjusted to idling or starting value wherever the fuel control throttle is adjusted to idling or starting condition, thus minimizing in a very important degree the tendency of the engine to stall.

Other objects of the invention will be, in part pointed out in the following detailed description of certain illustrative but preferred embodiments of the invention, and will be in part obvious in connection therewith.

The invention accordingly comprises the features of construction combinations of elements, and arrangement of parts, which will be exemplified in the construction hereinafter set forth and the scope of the application of which will be indicated in the claims.

For a more complete understanding of the nature and objects of the invention, reference is had to the following description of the illustrative embodiments of the invention, and to the accompanying drawing in which:

Fig. 1 is a partially diagrammatic elevation showing the invention as applied to an internal combustion engine, parts being in section for clearness of disclosure and Fig. 2 is a similar elevation showing a slightly modified embodiment.

Referring to the drawing for a detailed description of the illustrative embodiments of the invention there referred to and first to the embodiment of Fig. 1, a portion of the cylinder block of an internal combustion engine is indicated at 5, the intake manifold with fuel passages leading through is indicated at 6 and the carburetor is indicated at 7. A fuel supply pipe 8 conducts the fuel such as gasoline from a suitable supply source to the carburetor 7. These parts are shown diagrammatically as their form and construction are well known in the art and for the purposes of this invention the particular form thereof is not of importance and they may be varied as desired in accordance with standard practice.

A butterfly control or throttle valve 9 is positioned within the fuel passageway leading from the carburetor being pivotally mounted upon a spindle 10 on the outer end of which is fixed a rock arm 11 having a slotted or bifurcated end 12. An operating lug or pin 13 is mounted upon the main throttle rod 14 extending into the slot of the operating lever or rock arm 11 to provide an operating connection for throttle valve 9. The carburetor may be fitted with any preferred air supply arrangement (not shown) for volatilizing the gasoline and mixing therewith and an auxiliary air supply pipe 15 opens into the fuel passageway leading into the intake manifold 6. This auxiliary air duct may be arranged to conduct the air in contact with the exhaust manifold, a portion of which is indicated at 16, so as to preheat the air passing to the intake manifold through the auxiliary air supply pipe. There is also a butterfly control valve 17 positioned in the auxiliary air duct 15 being mounted upon a spindle 18 which carries at its outer end an operating lever or rock arm 19 having a slotted or bifurcated end 20, the slot of which receives an operating lug or pin 21 mounted upon an operating link 22.

The main throttle rod or operating link 14 for the throttle valve 9 is conveniently mounted concentrically with the auxiliary operating link 22 shown as being in the form of a sleeve surrounding the link 14 whereby these two operating links may slide longitudinally relatively to each other. A lower supporting bracket 23 is provided for the operating sleeve 22 having an apertured bearing 24 in which the sleeve is mounted for sliding movement. A similar upper supporting bracket 25 is provided with a similar apertured bearing 26 in which the upper end of the operating sleeve is slidably received. The bracket 25 is shown as mounted upon a supporting base or control panel 27. The control panel is preferably positioned for ready access by the operator. In this connection it is to be observed that the drawing is somewhat diagrammatic and that the operating connections may be constructed and proportioned so that the control panel 27 may be adjacent to the operator while the carburetor is in a more or less remote position as in standard practice in motor vehicles and air craft.

Mounted upon the control panel is the main control or throttle lever 28 pivotally mounted at 29 and having a slotted or bifurcated end 30, the slot of which receives an operating pin or lug 31 mounted upon the upper end of the throttle rod 14. A similar operating lever 32 is provided for operating the sleeve link 22, being pivotally mounted at 33 upon the control panel and having a bifurcated or slotted end 34 connected to the pin 35 mounted upon the sleeve link. Both operating levers 28 and 32 may be provided with pointers or indexes for moving over appropriate scales for indicating the positions of the throttle and auxiliary valves.

The upper end of the throttle link or rod 14 is threaded as indicated at 36 and a threaded nut 37 runs upon this thread. The nut 37 forms a lug or seat against which the adjacent end of the sleeve link 22 may rest, thus limiting relative sliding movement between the two operating links in one direction while movement in the opposite direction is not limited thereby. By means of this arrangement the operating connection between the throttle rod 14 and operating sleeve 22 is readily adjustable to any desired position merely by turning the nut 37 upon its thread.

The objects and nature of the invention having been set forth and an illustrative embodiment thereof described in detail, the operation will now be clearly understood.

When the engine is operating under load as when an automobile is traveling or an aeroplane is in flight, the main control lever 28 is swung downwardly from the position shown in the drawing, thus opening the butterfly throttle valve 9 and admitting the fuel mixture from the carburetor to the intake manifold. Under running conditions, the mixure of the fuel may be controlled by manual adjustment of the auxiliary lever 32, thus controlling the butterfly control valve 17 to admit air to the intake manifold. By means of such manual adjustment, the mixture is readily controlled to provide the fuel mixture best adapted for the engine when operating under load. Under running conditions, the engine requires a leaner fuel mixture and consequently the control valve 17 will be opened to admit air through the auxiliary air pipe 15. Thus, it will be seen that both the main throttle valve 9 and the auxiliary valve 17 may be independently manually controlled when valve 9 is in open or partially open position.

Suppose now that it is desired to stop the automobile or to land the aeroplane or other air craft, the operator moves the main control lever 28 to adjust the throttle valve 9 to idling position. During this movement, the operating lug or nut 37 contacts with the sleeve 22 thus automatically adjusting the auxiliary air control valve 17 to its initial closed position. This actuation automatically sets the fuel control system to supply the proper mixture of fuel to the engine while idling. Since a richer mixture is required for this purpose, the auxiliary air valve is moved to closed position while the throttle valve 9 is closed or nearly closed admitting just enough fuel to the engine to cause it to idle or run slowly. The adjustment of the carburetor is also now correct for supplying the proper mixture for starting the engine or accelerating it from its idling condition. It will, therefore, be seen that whenever the main fuel control throttle is adjusted to idling position, the carburetor is automatically adjusted to supply idling or starting mixture without any effort or the exercising of memory on the part of the operator.

This feature is of great practical importance in the operation of automobiles or aeroplanes because when the throttle is moved to idling position, the correct idling mixture is automatically supplied and the tendency to stop or stall the engine prematurely is thus diminished in a very material degree. The carburetor adjustment is also correct for supplying starting mixture and the tendency to stall at starting is also materially diminished. This is of particular importance in the operation of aeroplanes when it is taken into consideration that a stall or "dead stick" in attempting a landing is likely to result in a casualty. Furthermore, in the operation of aeroplanes it is found necessary to adjust the mixture at the higher altitudes and this may be readily accomplished in the improved fuel control mechanism by manual control of the auxiliary air valve 17. Furthermore, when the throttle is closed to idling position after such adjustment, the mixture is automatically controlled to starting value.

In the embodiment of the invention shown in Fig. 2, the general principles of the fuel control system are the same, but in this case the sleeve link 22 is connected for controlling the fuel supply to the carburetor 7ª by means of an operating lever 19ª connected at one end as at 38 to the carburetor for controlling the fuel flow thereto. The other end of the operating lever is connected through the bifurcated end 20ª to the lug 21ª mounted upon the sleeve 22. Thus, control of the mixture supplied to the engine will be exerted as in the other embodiment to automatically supply idling or starting mixture when the throttle valve is moved to idling or starting position. The operation of this form of the invention will therefore be fully understood without further detailed description. It will be understood furthermore that the auxiliary control for the fuel mixture may be exerted by control both upon the carburetor or fuel flow thereto and upon flow of air through the auxiliary inlet.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention what I claim as new and desire to secure by Letters Patent is:

1. In a fuel control system for internal combustion engines, in combination, means for controlling fuel flow to the engine, mixture controlling means controlled automatically by said flow controlling means when the latter is controlled to reduce fuel flow to correspondingly vary the mixture of the fuel to adapt it for the reduced fuel flow, and means whereby said flow controlling means, when being adjusted to increase the fuel flow, is inactive to control said mixture controlling means.

2. In a fuel control system for internal combustion engines, in combination, means for controlling fuel flow to the engine, mixture controlling means controlled automatically by said flow controlling means only when the latter is controlled to reduce fuel flow to insure a corresponding variation in the mixture of the fuel to adapt it for the reduced fuel flow, and means whereby said mixture controlling means may be manually operated to vary the mixture independently of said flow controlling means.

3. In a fuel control system for internal combustion engines, in combination, means for controlling fuel flow to the engine, means for varying mixture of the fuel to adapt it for different operating conditions, and means exerting automatic control upon said mixture varying means to supply idling mixture operable only when said flow controlling means is adjusted into idling position.

4. In a fuel control system for internal combustion engines, in combination, means for controlling fuel flow to the engine, mixture controlling means for varying mixture of the fuel to adapt it for different operating conditions, means exerting automatic control upon said mixture controlling means to supply idling mixture when said flow controlling means is adjusted into idling position, and means whereby said flow controlling means when being adjusted to increase the fuel flow is inactive to control said mixture controlling means.

5. In a fuel control system for internal combustion engines, in combination, means for controlling fuel flow to the engine, mixture controlling means for varying the mixture of the fuel to adapt it for different operating conditions, means exerting automatic control upon said mixture controlling means when said flow controlling means is adjusted in one direction only, and means whereby said mixture controlling means may be manually operated to vary the mixture independently of said flow controlling means.

6. In a fuel control system for internal combustion engines, in combination, means for controlling fuel flow to the engine, mixture controlling means for varying mixture of the fuel to adapt it for different operating conditions, means exerting automatic control upon said mixture controlling means to supply idling mixture when said flow controlling means is adjusted into idling position, means whereby said flow controlling means when being adjusted to increase the fuel flow is inactive to control said mixture controlling means, and means whereby said mixture controlling means may be manually operated to vary the mixture independently of said flow controlling means when the latter is in open or partially open position.

7. In a fuel control system for internal combustion engines, in combination, a fuel control valve for controlling passage of fuel to the intake manifold, valve operating means under control of an operator for controlling said valve, means for controlling the mixture of the fuel passing to the engine, operating means for said mixture controlling means automatically controlled to provide idling mixture when said valve operating means is adjusted to idling position, and means whereby said valve operating means may be adjusted in valve opening direction independently of operation of said mixture controlling means.

8. In a fuel control system for internal combustion engines, in combination, a fuel control valve for controlling passage of fuel to the intake manifold, valve operating means under control of an operator for controlling said valve, means for controlling the mixture of the fuel passing to the engine, operating means for said mixture controlling means automatically controlled to provide idling mixture when said valve operating means is adjusted to idling position, means whereby said valve operating means may be adjusted in valve opening direction independently of operation of said mixture controlling means, and means whereby said mixture controlling means may be independently adjusted to vary the mixture when said valve operating means is in valve opening position.

9. In a fuel control system for internal combustion engines, in combination, a fuel control valve for controlling passage of fuel to the intake manifold, valve operating means under control of an operator for controlling said valve and including an operating link, means for controlling the fuel mixture including a mixture controlling valve, controlling means including a link for controlling said mixture valve, and an adjustable one-way operating connection between said links whereby said mixture controlling means is adjustable to an initial position when said fuel valve operating means is adjusted to an initial position.

10. In a fuel control system for internal combustion engines, in combination, a fuel control valve for controlling passage of fuel to the intake manifold, valve operating means under control of an operator for controlling said valve and including an operating link, means for controlling the fuel mixture including an auxiliary air inlet and a mixture controlling valve therefor, controlling means including a sleeve link slidable upon said first-mentioned link for controlling said mixture valve, and a connection between said links whereby said mixture controlling means is adjusted to an initial position when said fuel valve operating means is adjusted to an initial position.

11. In a fuel control system for internal combustion engines, in combination, a fuel control valve for controlling passage of fuel to the intake manifold, valve operating means under control of an operator for controlling said valve and including an operating link, means for controlling the fuel mixture including a mixture controlling valve, controlling means including a sleeve link slidable upon said first-mentioned link for controlling said mixture valve, and an adjustable one-way operating connection between said link and said sleeve link whereby said mixture controlling means may be adjusted to provide an idling mixture when said fuel valve operating means is adjusted to idling position.

12. In a fuel control system for internal combustion engines, in combination, fuel supply means comprising means for controlling the fuel mixture and means for controlling the fuel flow, said flow control means being operable automatically to control the mixture of said fuel during flow variations in one direction, but inoperable to control said mixture during flow variations in the other direction.

13. In fuel control system for internal combustion engines, in combination, means for controlling fuel flow to the engine and means for adjusting the mixture of said fuel, both of said means being normally operable independently of each other and other means functioning upon reduction of said fuel supply to vary correspondingly the mixture of the fuel to adapt it for the reduced fuel supply.

In testimony whereof I affix my signature.

MILLER REESE HUTCHISON.